March 14, 1961 W. SCHEERER 2,974,861
ACCUMULATOR AND COUNTER MECHANISM
Filed Nov. 20, 1958 6 Sheets-Sheet 1

INVENTOR.
WALTER SCHEERER
BY
*Francis V. Giolma*
ATTORNEY

United States Patent Office 2,974,861
Patented Mar. 14, 1961

2,974,861

ACCUMULATOR AND COUNTER MECHANISM

Walter Scheerer, Sindelfingen, Germany, assignor to International Business Machines Corporation, New York, N.Y., a corporation of New York Filed Nov. 20, 1958, Ser. No. 775,292

5 Claims. (Cl. 235—92)

This invention relates generally to accounting machines, and it has reference in particular to an accumulator having a counter mechanism of the step-by-step type.

Counters in calculating or accounting machines are frequently driven by so-called stepping mechanisms. Such known stepping mechanisms mostly comprise an electromagnetically operated driving pawl engaging the teeth of a disc rigidly mounted on the counter shaft and advancing said disc at each pulse applied to said electromagnet by one tooth space. A spring acting on said driving pawl retracts said pawl to its home position. It has also been proposed to achieve the moment of said retracting spring by means of an electromagnet. This avoids the requirement that the electromagnet moving said driving pawl must, besides providing the force for rotating the counter, also provide the force for overcoming the retracting spring. Despite such improvements, counters of this type generally operate at relatively low speeds.

The present invention improves such counters principally with respect to obtaining higher counting speeds by providing a feeler or detent connected with the counter shaft, preferably a pin mounted perpendicularly on said counter shaft, which as the counter shaft moves axially is pressed against the sloping tooth edges of oppositely disposed toothed discs. According to another object of the invention, a disc attached to said counter shaft serves as an armature for an electromagnet supplied with the pulses to be counted. This minimizes the mass to be accelerated during the rotation of the counter, so that as well as attaining the above-mentioned high operating speeds, wear on the moving parts is reduced, and the power required to drive the mechanism is greatly reduced.

Accordingly, one object of the invention is to provide a faster stepping relay.

Another object of the invention is to reduce the mass of the moving parts in the stepping mechanism of a counter.

Yet another object of the invention is to provide for reducing the frictional drag on the moving elements of a counter mechanism.

Other objects will in part be obvious, and will in part be explained hereinafter.

Other objects of the invention will be pointed out in the following description and claims and illustrated in the accompanying drawings, which disclose, by way of examples, the principle of the invention and the best mode, which has been contemplated, of applying that principle.

Figure 1:
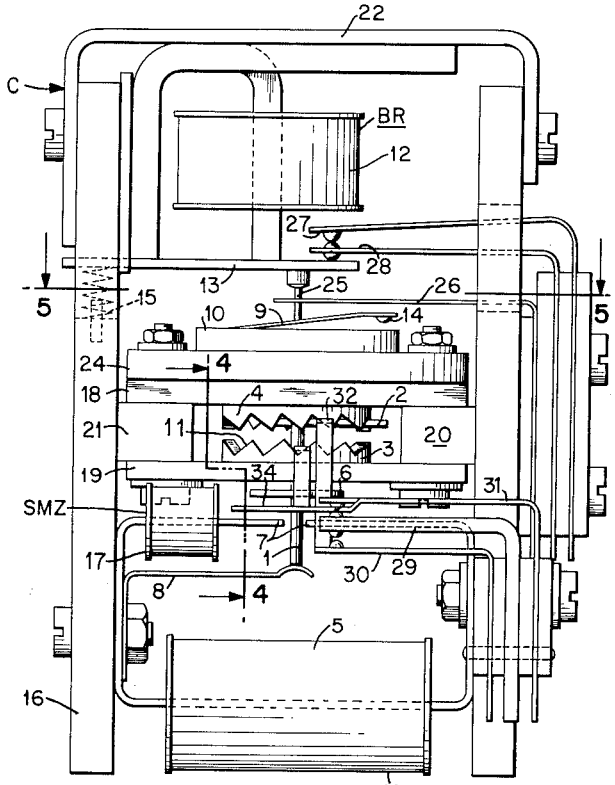
Fig. 1 represents a general front elevational view of the counter.
Figure 6A:
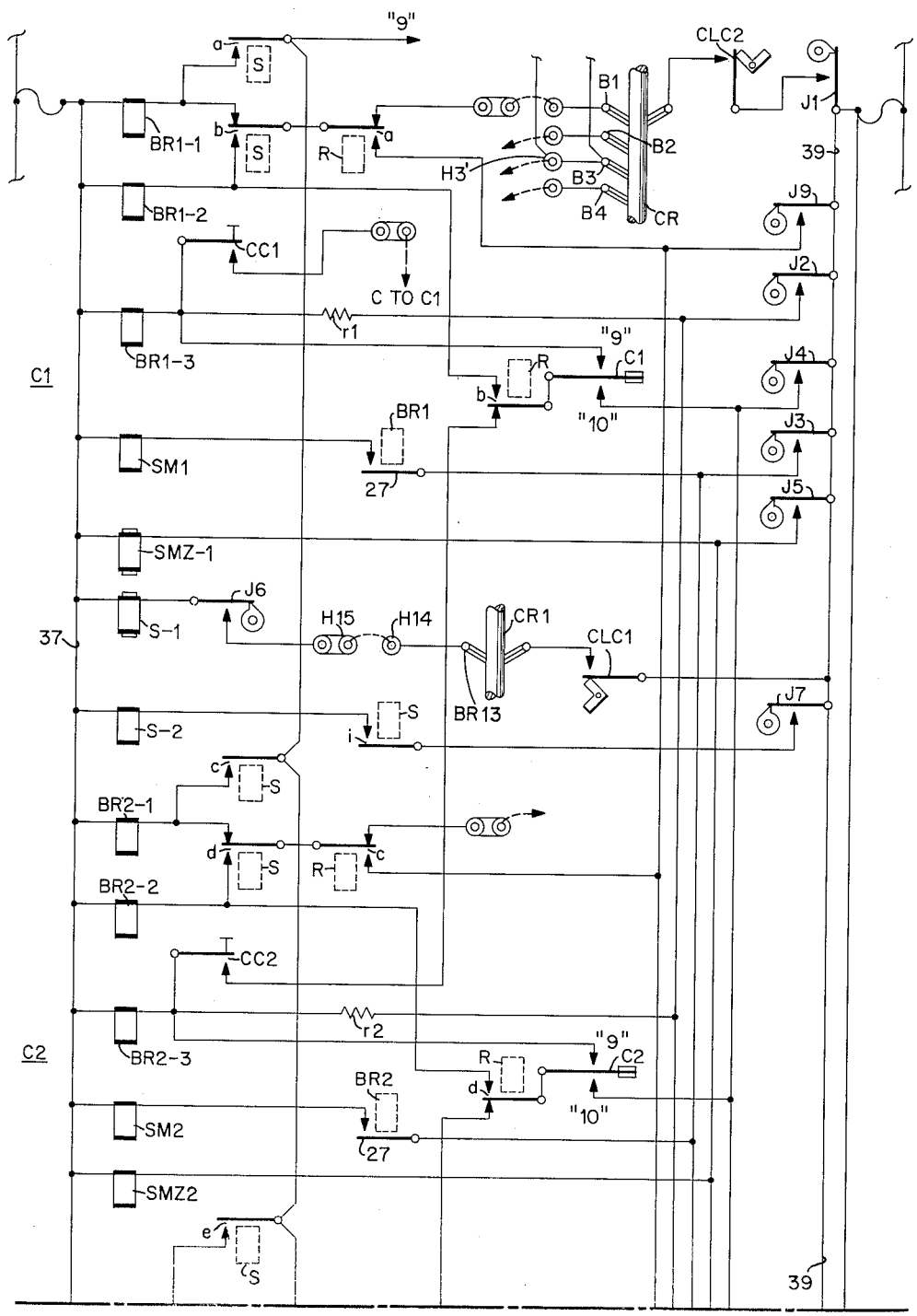
Figure 6B:
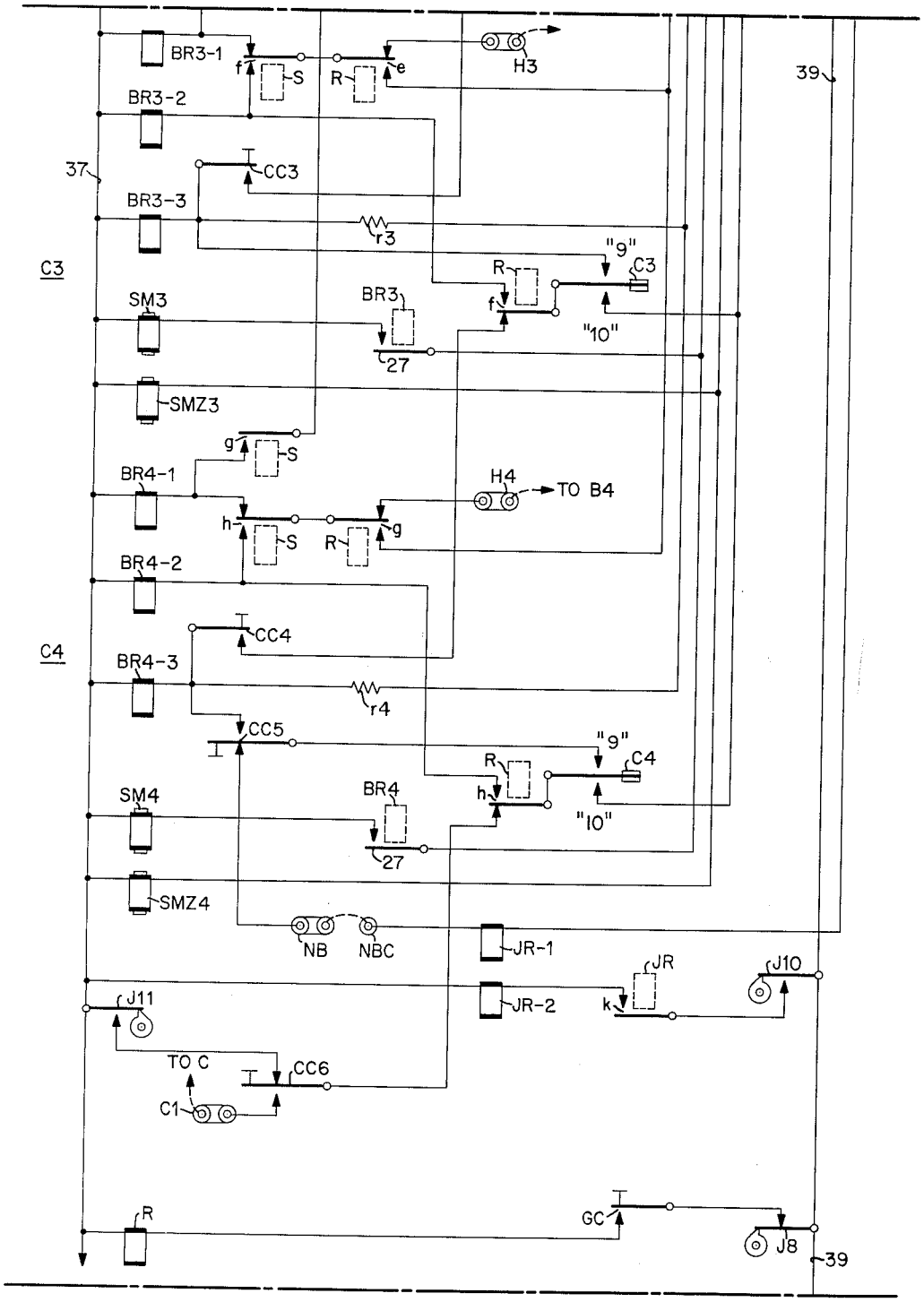
Figure 6C:
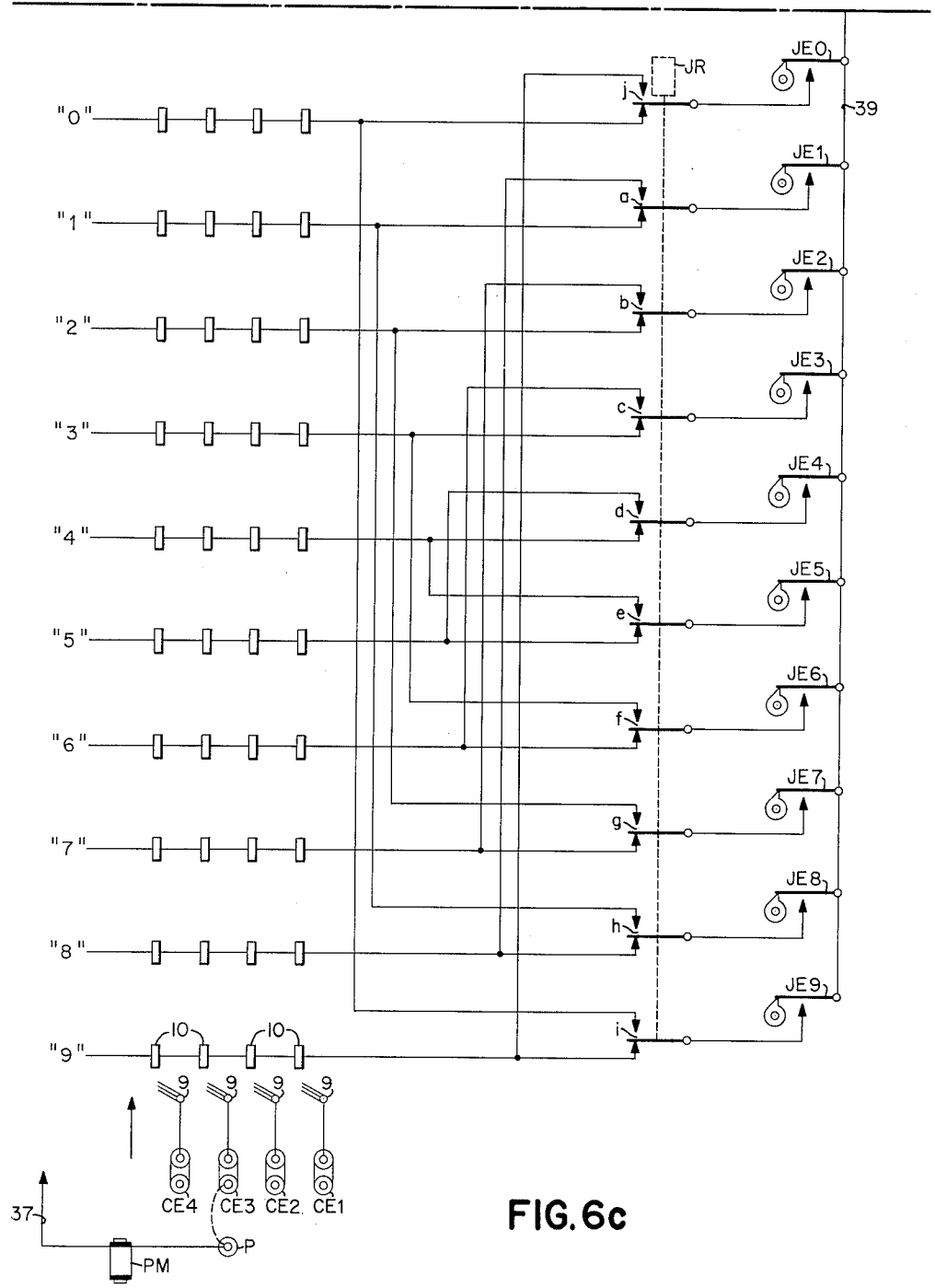

Figs. 6a, 6b and 6c, located one above the other, show diagrammatically a counter circuit embodying the stepping mechanism of Fig. 1.

Figure 7:
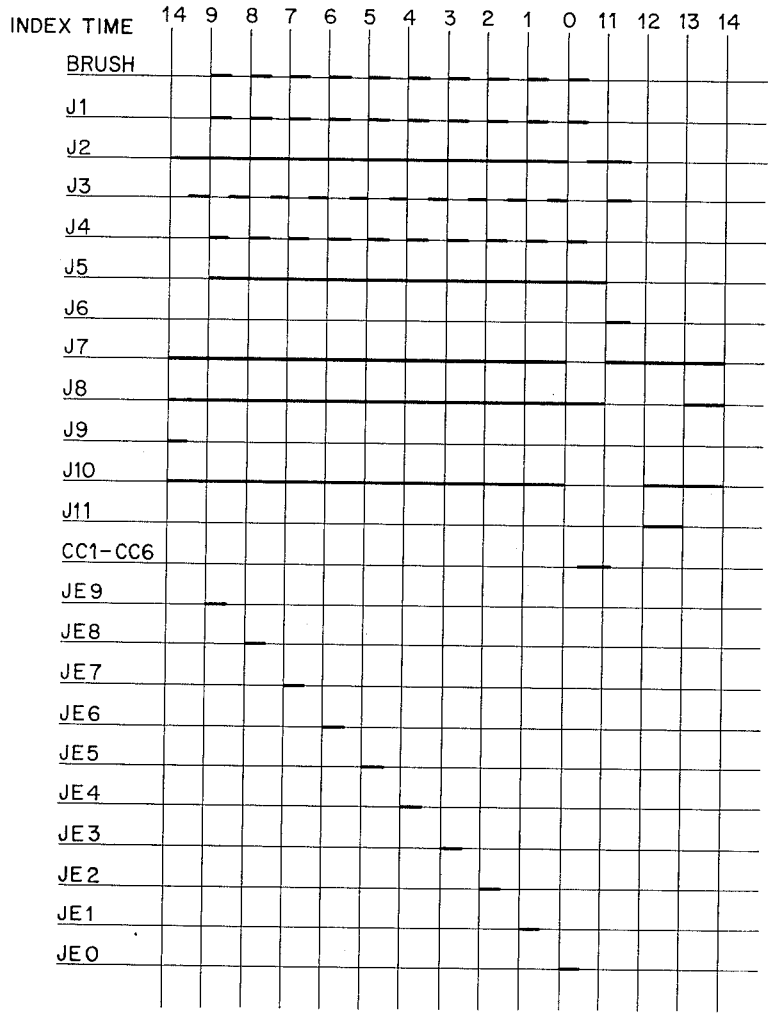

Fig. 7 represents a timing diagram of the control cams for the counter circuit of Figs. 6a through 6c.

Referring particularly to Fig. 1, it will be seen that a counter device C has a vertically movable and rotatable counter shaft 1 provided with a radially extending detent pin 2 projecting to one side thereof for engaging the teeth of a pair of oppositely disposed spaced apart lower and upper toothed or ratchet flanges 3 and 4, respectively. The shaft 1 is provided with a disc armature 6 of magnetic material, which is adapted to be attracted downwardly by a stepping magnet SM, comprising an operating winding 5 having pole pieces 7 disposed on opposite sides of the shaft 1 slightly below the armature 6. A spring 8 serves to resiliently support the counter shaft 1 in its free position and bias it to return to that position when the operating winding 5 of the stepping magnet SM is de-energized.

Figure 3:
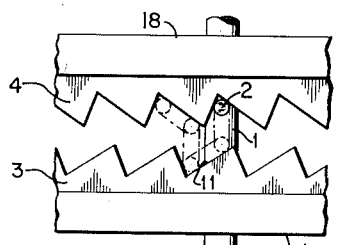
Fig. 3 is an enlarged partial elevational view of the operating shaft, detent pin and toothed flanges.

Referring to Fig. 3, it may be seen that the essential portion of the stepping mechanism comprises the shaft 1 carrying a radial detent pin 2, which as the shaft 1 is raised and lowered by means of the spring 8 and stepping magnet 5, respectively, moves between the teeth of the flanges 3 and 4. In its inoperative condition, the shaft 1 is biased upwardly by the spring 8 until the detent pin 2 rests in the bottom of the valley between a pair of teeth of the upper toothed flange 4. When now the magnet 5 is energized, the disc 6 is attracted downwardly toward the poles 7 of the magnet, and the shaft 1 is drawn downwardly causing the pin 2 to engage the slightly offset sloping surface 11 of a coresponding tooth in the lower flange 3. The pin 2 now slides along the edge of the tooth into the tooth bottom, at the same time rotating the shaft to approximately 18° in a clockwise direction or to the left. As the teeth of the flanges 3 and 4 are mutually displaced by approximately one-half tooth space, the pin 2, after de-energization of the magnet 5, is urged upwardly by the spring 8 against, and slides along, the opposite sloping surface of a corresponding tooth in the flange 4, thus rotating the shaft another 18° in a clockwise direction. Thus by energizing and de-energizing the magnet 5, a total rotation of 36° is produced, consisting of two partial rotations or half-steps.

Figure 2:
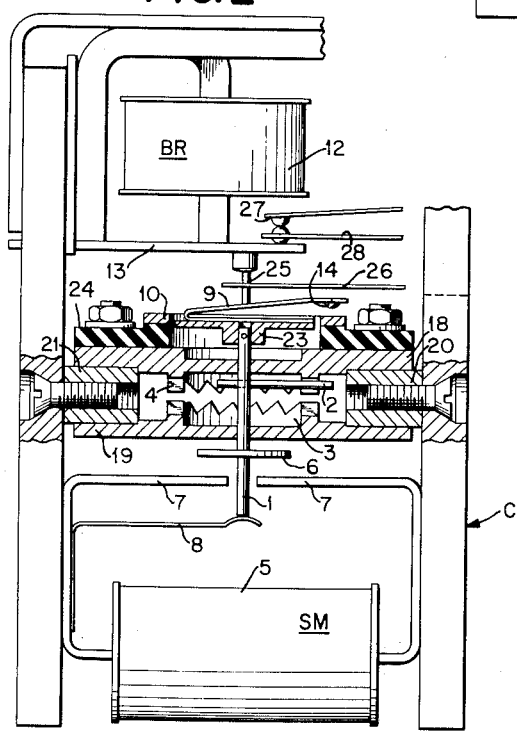
Fig. 2 shows a partial front elevational view of the counter with the central portion vertically sectioned.

Referring to Figs. 1, 2 and 6, it will be seen that the counter is also provided with a brush relay BR comprising an electromagnet 12 having pick, neutralizing or differential and hold winding sections BR–1, BR–2, and BR–3 acting on an armature 13, which is normally biased by means of a spring 15 to urge a spring finger or emitter brush arm 9 downwardly to engage different ones of a plurality of emitter digit contacts 10 which are disposed to be engaged by a contact 14 mounted on the finger 9.

Figure 4:
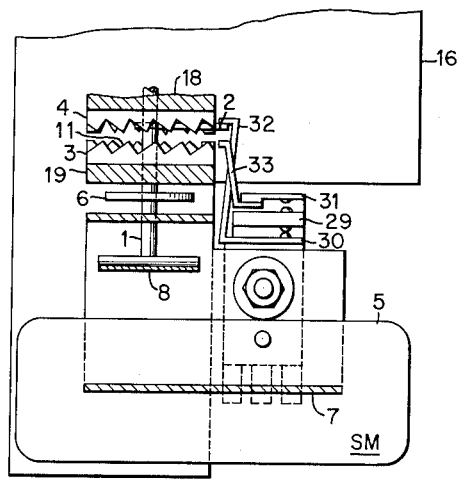
Fig. 4 is a partial sectional view taken along the line 4—4 of Fig. 1 showing the relation of the "9" and "10" contacts with the detent pin.
Figure 5:
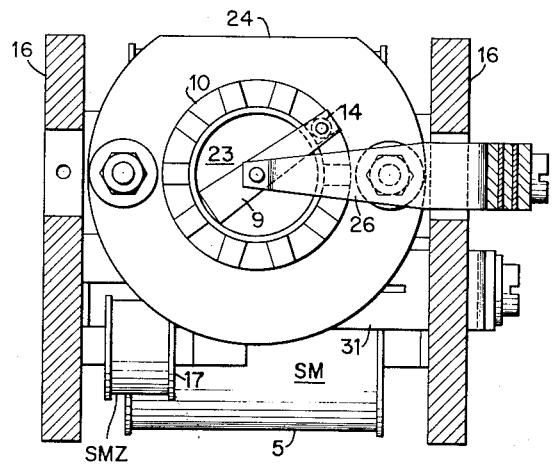
Fig. 5 is a sectional view along the line 5—5 of Fig. 1 showing the brush and emitter contacts.

These components of the counter are assembled between oppositely disposed side plates 16, which are connected by means of a U-shaped connector 22. The toothed flanges 3 and 4 are respectively supported in any suitable manner by means of journal plates 18 and 19 having central openings therein for slidably receiving the shaft 1. The journal plates 18 and 19 are maintained in spaced relation by means of spacers 20 and 21 secured to the side plate 16 in any suitable manner such as by means of screws or the like. The emitter brush arm 9 is carried by the shaft 1 by means of an insulating disc 23 mounted on the shaft for rotating the contact 14 to engage different ones of the emitter segment 10 supported on the upper journal plate 18 by means of insulation 24. The arm 9 is normally depressed by means of a pin 25 secured to the armature 13, through the action of the spring 15. A connector 26 maintains contact with the arm 9 through the medium of the pin 25. The brush relay BR is provided with normally open stepping magnet contact 27, which is closed by armature 13 when the electromagnet 12 is energized to raise the contact 14 off the segment 10. The counter is provided with a "9" contact 30 and a "10" contact 31, which are normally spaced from, but which are disposed to be selectively actuated into engagement with a stationary common contact member 29 by means of the pin 2 as best shown in Fig. 4. The "9" and "10" contacts 30 and 31 are provided with upstanding ears 32 and 33, respectively, which are respectively raised and depressed by movement of the pin 2 into the "9" and "10" positions, respectively. The "10" contact 31 is provided with an extension 34 of magnetic material disposed adjacent one of the pole pieces 7 of the stepping magnet 5, and this pole piece is provided with an auxiliary electromagnet SMZ including an energizing winding 17 for maintaining the "10" contact in the operative position even after it is released by the pin 2.

In connection with Figs. 6a through 6c, a plurality of the hereinbefore described counters are utilized as punched card controlled counter orders of an accumulator. Its application is, however, not limited to this field, and it is possible generally to count pulses of any possible origin or to initiate control operations by such pulses.

As illustrated, the accumulator of Figs. 6a through 6c relates to sensing the values contained in a punched card and entering them into a four-position counter, which card may be sensed by means of contact brushes during a so-called machine cycle in a well-known manner in the art. Associated with each card column as is customary, there is one brush as represented by the brushes B1 through B4, which are typical. As the punched areas of a card pass the said brushes the brushes engage a cooperating contact roll CR to provide a control circuit. The card is fed between the roll and brushes at a speed enabling the individual holes to be sensed at index or brush pulse times corresponding to the numerical value of such holes in a manner as is well known in the art.

In the present instance, this value is entered in the third order position of a four-position counter through the brush B3. For example, as soon as the brush B3 (Fig. 6a) engages the contact roll CR through, for example, the "5" hole of a card being read, the brush relay BR3 of the third counter order, namely, counter C3 is energized as follows: from the conductor 37 at the left-hand side of the drawing through winding BR3–1 of brush relay BR3, contact Sf n/c of a subtraction relay S (where Sf n/c refers to a normally closed contact f of relay S), contact Re n/c of a reset relay R, hub H3 and its connection to the corresponding hub H3' for the brush B3, contact roll CR, card lever contact CLC2 pulse limiter or circuit breaker J1, to the conductor 39 and the other side of the line. One brush relay BR is provided for each counter order, the brush relays BR1 through BR4 of Figs. 6a through 6c, corresponding to the four counters C1 through C4 for orders 1 through 4.

Brush relay BR3 is energized through winding BR3–1 and holds through its hold winding BR3–3 by the following circuit: winding BR3–3, resistor r3, cam contact J2, and conductor 39 to the other side of the line, the winding BR3–3 being arranged so it can only hold the armature 13 but cannot attract it from its inoperative position. As shown in Figs. 6b and 7, about ½ point after index point "5," the stepping relay SM3 is actuated by the energization of its winding (5 in Fig. 1) through the contact 27 of relay BR3 and the cam contact J3, to conductor 39 and the other side of the line. The disc armature 6 of counter shaft 1 is attracted and rotated as described hereinbefore by means of the pin 2 attached to the shaft, the pin sliding along the tooth edges of the lower flange 3 during the first half-step. The contact finger or emitter brush arm 9, which rotates with the shaft 1, is lifted off the segments 10 as the armature 13 of the brush relay is attracted upwardly by energization of the winding BR3–1 of electromagnet 12. As soon as the winding of relay SM3 is de-energized (in our example, at index time "4" as contact J3 opens), the disc 6 moves together with the shaft 1 under the influence of the spring 8 to its home or inoperative position. In doing so, the pin 2 slides along the opposite tooth edge of the flange 4 as the drive performs the second half-step of the rotational advancement. By means of the coil or winding of relay SM3, which is periodically energized through the cam J3, the rotational movement is continued until at index point "0" the cam contact J2 opens. The shaft 1 and the contact finger or arm 9 have rotated into the position corresponding to the value "5," ½ point after index "0."

Let it be assumed now that the value 3 is to be subtracted from the counter in order 3, whereas in counter orders 1, 2 and 4 the value "0" is subtracted. Subtraction is carried through according to the nine's complement principle. According to the common practice, the card containing the value to be subtracted is provided with a control hole. The latter is detected by means of a sensing station including a brush BR13, and a contact roll CR1 arranged ahead of the sensing station including the contact roll CR, and causes the counter to be switched to subtraction by the energization of the subtraction relay S. The relay S is energized through a circuit extending from conductor 37 through the winding S1, cam contact J6, hub H15, plug connection to hub H14, brush BR13, contact roll CR1, and contact CLC1 to the conductor 39 and the other side of the line.

Relay S holds through winding S2, its contact i and cam contact J7. At index "9" of the following cycle, a pulse is applied through the contact e of relay S to the winding BR3–1. The brush relay BR3 is energized and holds in the above-described manner. With its contact 27, BR3 energizes the magnet SM3 of the associated stepping unit which is periodically energized by the pulse contact J3. At index point "3," the card hole corresponding to digit "3" is presented to the sensing brush B3. Thereby, the winding BR3–2 is energized to drop relay BR3 through the following circuit: from conductor 37 to winding BR3–2, contact Sf n/o, contact Re n/c, hub H3 and plug connection to hub H3', brush B3, contact roll CR, card contact CLC2, and cam contact J1 to the conductor 39 and the other side of the line. Thus, the counter has been advanced six steps corresponding to the nine's complement "6" of the digit "3" to be subtracted.

The counter orders 1, 2 and 4, which together with the counter order 3, form a counter group, are pulsed at index "9" through contacts Sa, Sc and Sg in the above-described manner. As in these three orders, the value "0" has to be subtracted, their brush relays remain energized until cam J2 breaks. Thus, the counter now contains the complementary number 9699. When to this value the positive value 800 is added, the result is as follows:

```
  9699
   800
 ─────
 ┌0499
 └──→1
  0500
```

Due to the connection of hub C, Fig. 6a, with hub C1, Fig. 6b, the tens carry is entered from the counter order 4 into counter order 1. At this time, however, the operation will be described which takes place when the positions "9" and "10" are reached in counter order 2. When the counter order 2 has reached the position corresponding to the value "9," the pin 2 moves the angular end of the ear 32 connected to the contact member 30 (Fig. 4) so that the "9" contact member 30 engages the stationary contact 29. If now the counter order is advanced to its "10" position, the pin 2 on the first half step by means of ear 33 attached to the "10" contact 31 also urges the latter towards the stationary contact 29. An armature 34 (Fig. 1) also connected to the "10" contact 31 is held by the coil of relay SMZ (17) which is energized from index "9" to "11" through the cam contact J5 so that the "10" contact 30 remains closed until index "11," even though the disc 6 is released during the second half of the stepping action.

If, for example, the "10" contact 31 of the counter C2 of order 2 is closed, a tens carry to order 3 is initiated between index "0" and index "11" through cam J4. The hold winding BR3–3 of brush relay BR3 is picked as follows: from conductor 37 through winding BR3–3, mechanically operated contact CC3, contact R*d* n/c, "10" contact 31 of counter C2 of order 2, and cam contact J4 to conductor 39 and the other side of the line. As the relay winding BR3–3 is energized without the resistor *r*3, it picks and holds through resistor *r*3 and the cam contact J2 as described above. Accordingly, the stepping system is advanced one step through contact 27 of brush relay BR3. Contact 27 of BR3 is released when contact J2 is opened between index points "11" and "12."

If the counter order 2 receives the value "9" and index "0," and a tens carry is performed from counter order 1, a tens carry pulse is applied to the winding BR3–3 through the "10" contact of counter C1 of order 1, contact R*b* n/c, contact CC2, the "9" contact 30 of counter order 2, contact R*d* n/c, and contact CC3.

A tens carry from the fourth to the first order is accomplished as follows: the winding BR1–3 being energized through a circuit extending from the conductor 37, through operating winding BR1–3, mechanically operated contact CC1, hub C, connection to hub C1, mechanically operated contact CC6 n/o, contact R*h* n/c, closed contact "10" of counter C4 of order 4, pulse contact J4, and conductor 39 to the other side of the line. This causes brush relay BR1 to be energized and causes a value "1" to be added in the counter order 1.

A resetting operation is initiated by actuation of the group contact GC during a machine cycle provided for the resetting operation. At index "13," the reset relay R is energized through the cam contact J8, and through its contacts R*a* to R*h* controls the actual resetting operation. At index "14," that is, one point before index "9" windings BR1–1, BR2–1, BR3–1 and BR4–1 are energized through the contacts S*b* n/c, R*a* n/o, S*d* n/c, R*c* n/o, S*f* n/c, R*e* n/o, S*h* n/c, R*g* n/o and cam contact J9. Brush relays BR1 through BR4 hold through their hold windings BR1–3 through BR4–3, resistors *r*1 to *r*4 and cam contact J2. As soon as the "10" contact of each counter order closes, the differential windings BR1–2 through BR4–2 are energized as follows: from conductor 37 through windings BR1–2 to BR4–2, contact R*b* n/o, R*d* n/o, R*f* n/o, R*h* n/o, "10" contact of C1 to C4, cam contact J4 to conductor 39 and the other side of the line. The brush relays BR1 through BR4 are de-energized therefore, and the counter orders receive the value "0."

Through hubs CE1 to CE4, as shown in Fig. 6c, it is determined in connection with the emitter pulses JE0 to JE9 for each counter order which of the segments 10 the respective contact finger 9 of the individual counter order is engaging. Let it be assumed that a print magnet PM controls the printing of the value in counter order 3; then this magnet with the value "5" standing in counter order 3 is energized as follows: from the one side of the line through the winding of PM, hub P, plug connection to hub CE3, contact finger 9 of counter C3 of order 3, segment "5" for the emitter segments "10" of counter order 3, line "5" contact JR5 n/c, cam contact JE5 to the other side of the line.

With a complementary value standing in the counter, the highest order counter (4) contains the value "9." Thus the "9" contact that order is closed and the conversion or complementary relay JR can be energized through the following circuit: pulse contact CC6, R*h* n/c, contact "9" of counter order 4, contact CC5 n/c, hub NB, plug connection to hub NBC, coil JR1 and conductor 39 to the other side of the line. The complementary relay JR picks up and holds through its winding JR2 as follows: from conductor 37 through winding JR2, contact JR*k*, cam contact J10, and conductor 40 to the other side of the line. If the counter order 3 contains the complementary value "6," the value "3" is read out of counter order 3 through line "6," contact JR*c* n/o and pulse contact JE3.

From the above description, and the accompanying drawings, it will be apparent that the present invention provides an improved step-by-step counter which is efficient and effective particularly for use in accumulators and accounting machines and the like. By reducing the weight of the moving mass to a minimum, a high speed operation is obtainable, and by lifting the emitter brush from the emitter segments during the stepping operation, the drag on the moving parts is greatly reduced and therefore only a minimum of power is required to operate such device.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention therefore, to be limited only as indicated by the scope of the following claims.

What is claimed is:

1. In a step-by-step accumulating mechanism, an elongated rotary axially reciprocable member, detent means projecting radially on one side of said member, means for journalling said member, said means having a plurality of oppositely disposed ratchet teeth adapted to be alternately engaged by said detent means at the opposite ends of its reciprocation for imparting step-by-step rotary motion to the member, electromagnetic actuating means for moving said member in one direction, yieldable means for returning said member to an initial position, an emitter having relatively movable contact means actuated by said member, and means including biasing means and additional electromagnetic means selectively operable to restrain said biasing means for actuating said contact means to effect separation thereof during rotation of the member.

2. In a step-by-step accumulating mechanism, means for producing digit representing pulses, a movable accumulator element, detent means carried by said element, spaced apart journal means supporting the element for rotary and axially reciprocable movement, said journal means having oppositely disposed and peripherally displaced ratchet teeth disposed to be engaged by said detent means adjacent opposite ends of axial movement of the element, electromagnetic driving means for effecting axial movement of the element in one direction, resilient means biasing the element to return to a rest position in the opposite direction, emitter means including a plurality of peripherally disposed contact means and a rotary contact member actuated by the said element, and means for actuating the contact member including biasing means and electromagnetic means selectively operable for lifting the contact member from said contact means when the electromagnetic driving means is energized.

3. In a step-by-step accumulating mechanism, a reciprocable and rotatable shaft, a radially projecting detent pin, journal means supporting the shaft and having oppositely disposed spaced apart ratchet teeth engageable by the pin to effect rotary step-by-step advancement of the shaft, electromagnetic driving means for effecting axial movement of the shaft in one direction, resilient biasing means for returning the shaft to an initial rest position, an emitter having stationary contact members adapted to be engaged by a rotary contact member carried by the shaft, means including an electromagnet for lifting the rotary contact member off said stationary contact members, and means actuated by the electromagnet for effecting energization of the electromagnetic driving means.

4. In an accumulator, a rotatable axially reciprocable shaft having a disc of magnetizable material mounted thereon and having a detent pin projecting radially on one side of the shaft, a pair of spaced apart journal members journalling the shaft on opposite sides of the pin and having oppositely disposed peripheral ratchet teeth disposed to be engaged alternately by the pin during reciprocal movement of the shaft to impart step-by-step rotary motion to the shaft, a spring biasing the shaft in one direction, electromagnetic driving means acting on the disc to move the shaft in the opposite direction, an emitter having a plurality of peripherally disposed contact members and a rotary contact arm carried by the shaft to engage said contact members, electromagnetic means having an armature biased to cause said arm to engage said contact members, and energizable to actuate the armature to permit the rotary contact to disengage said stationary contact members, and contact means actuated by said armature to provide an energizing circuit for the electromagnetic driving means.

5. In a step-by-step counter mechanism, a rotatable axially reciprocable counter element, electromagnetic driving means for moving the element axially in one direction, biasing means for biasing the element in the opposite direction, detent means carried by the element, oppositely disposed ratchet means engaged by the detent means adjacent opposite ends of axial movement of the element to impart a step-by-step rotary movement in response to successive axial movements in opposite directions, an emitter having stationary contacts corresponding to the several digit positions in the order of counting, and a rotary contact arm actuated by the shaft, "9" and "10" contact means actuated by said detent means in the "9" and "10" digit positions of said emitter, electromagnetic means operable to lift the contact arm from the stationary contacts, contact means actuated by said electromagnetic means for effecting energization of said driving means, and means for maintaining operated the detent actuated contact means after said element is biased to return in the opposite direction.

References Cited in the file of this patent

UNITED STATES PATENTS

| | | |
|---|---|---|
| 701,627 | Shreiber et al. | June 3, 1902 |
| 820,119 | Kitt | May 8, 1906 |
| 1,295,175 | Keith et al. | Feb. 25, 1919 |
| 1,301,206 | Wescott | Apr. 22, 1919 |
| 1,802,459 | Caruso | Apr. 28, 1931 |